United States Patent [19]
Cronauer et al.

[11] 3,865,870
[45] Feb. 11, 1975

[54] OXIDATION OF METHYLATED BENZENES

[75] Inventors: Donald C. Cronauer, Gibsonia, Pa.; Larry G. Baumgard, Belpre, Ohio

[73] Assignee: Borg-Warner Corporation, Chicago, Ill.

[22] Filed: Mar. 14, 1973

[21] Appl. No.: 341,010

[52] U.S. Cl. ............................................. 260/524 R
[51] Int. Cl. ................................................ C07c 63/02
[58] Field of Search ................................. 260/524 R

[56] References Cited
UNITED STATES PATENTS

| | | | |
|---|---|---|---|
| 1,851,361 | 3/1932 | Jaeger | 260/524 R |
| 1,851,362 | 3/1932 | Jaeger | 260/524 R |
| 3,714,263 | 1/1973 | Cyba | 260/524 R |
| 3,775,472 | 11/1973 | Massie | 260/524 R |

*Primary Examiner*—Lorraine A. Weinberger
*Assistant Examiner*—Richard D. Kelly
*Attorney, Agent, or Firm*—Richard J. Schlott

[57] ABSTRACT

A process for the oxidation of methylated benzenes to carboxylic acids which consists of feeding concurrently streams of water, methylated benzenes and an oxygen containing gas (e.g., air) over a catalyst in a pressurized reactor. The reactor temperature and pressure are controlled to insure that an aqueous phase is maintained throughout the reaction and a desirable level of conversion is achieved. The carboxylic acid formed during the reaction may be recovered by precipitation from the aqueous stream.

6 Claims, No Drawings

OXIDATION OF METHYLATED BENZENES

BACKGROUND OF THE INVENTION

Prior to the instant invention, there were a variety of methods for oxidizing methylated benzenes to form carboxylic acids. One of the more widely used methods utilizes organic solvents and catalysts that are soluble in the solvents used as the vehicle in the oxidation of the benzenes. There are, however, inherent problems of recovering the product, solvent and/or catalyst in this system and these problems are extremely important to the economics of the process. Some of the previous processes, for example those using acetic acid, were quite uneconomical due to the problems of purifying the end product, i.e. separating out the solvent and catalyst from the system.

To the knowledge of the Applicants, the instant invention is one of the most efficient methods of preparing carboxylic acids from methylated benzenes in an aqueous system. The majority of the by-products formed in this process are intermediate oxidation products which may be fully oxidized by recycling.

SUMMARY OF THE INVENTION

The instant invention is a process for the catalytic oxidation of methylated benzenes to carboxylic acids using water as a medium and controlling the temperature and pressure in the aqueous system so as to provide a desirable level of conversion. The process may be carried out either as a fixed bed or fluid bed oxidation process and is capable of providing high yields of aromatic carboxylic acids by the oxidation of methylated benzenes.

The methylated benzenes and those carboxylic acids formed from the methylated benzenes are insoluble in water under normal temperatures and pressures. The catalysts and supports that are used in the reaction must be also insoluble under oxidation conditions or else the catalyst support system would rapidly degrade in the aqueous solution. In the instant process, the temperature and pressure are raised sufficiently to cause the reactants and products to become soluble in water. The product is thus easily recovered by lowering the temperature to cause precipitation. The solvent (water) may be recycled or economically disposed of.

The methylated benzenes that may be oxidized and converted to carboxylic acids, in accordance with this invention, are of the formula:

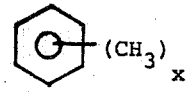

wherein X is 2–6 and preferably 2–4. Examples of the methylated benzenes are o-xylene, m-xylene, p-xylene, hemimellitene, pseudocumene, mesitylene, prehnitene, isodurene and durene, which on complete oxidation of the methyl groups form phthalic acid, isophthalic acid, terephthalic acid, hemimellitic acid, trimellitic acid, trimesic acid, prehnitic acid, mellophanic acid and pyromellitic acid, respectively.

The catalysts normally used to promote the reaction are selected from the group consisting of silver and the platinum family. Their metals include palladium ruthenium, platinum, rhodium, iridium and osmium. It has been found that ruthenium, palladium and silver are the preferred catalysts in the reaction. Suitable substrate supports for the catalysts include water-insoluble forms of alumina, silica, titania, zirconia, silicon carbide and carbon. Alpha-alumina and activated carbon are preferred catalyst supports. Alpha-alumina has excellent durability but catalyst supported on this has somewhat lower activity. Activated carbon supported catalysts have superior activity but are subject to burning and mechanical degradation. The noble metals in the catalyst composition will be in the range of 0.1–5.0 wt. % of noble metal to total catalyst composition.

The optimum temperatures under which the reaction occurs are from about 170°C. to about 300°C. and preferably 200°–260°C. The lower limit of temperature is established by the solubility of the reactants and products in water at reaction temperature. It is essential that the reactants have a degree of solubility at the lower temperature. The upper temperature limit is established at a level which avoids overoxidation.

The pressure used in the reaction is generally above atmospheric pressure and preferably 300–1200 psi.

The ratio of methylated benzenes to water is 3 parts water to 1 part methylated benzene to 30 parts water to 1 part methylated benzene with a preferred ratio of 5:1 to 15:1.

In the examples set forth hereinbelow, the reaction was controlled with respect to temperature, pressure and feed rates.

The reactions were conducted at elevated temperatures and pressures and the temperatures and pressures were returned to ambient prior to recovery of product. The product analysis, as well as the catalysts and substrates, are set forth, along with the reaction conditions, in the tables. In the tables, all parts are by weight, unless otherwise indicated. In table I, hereinbelow, Examples 1–4 set forth p-xylene as the methylated benzene used to convert to terephthalic acid and the active metals were ruthenium and palladium. In examples 3 and 4 it will be noted that mixtures of ruthenium on carbon and palladium on alumina were used. The supports used for the metal were carbon and alumina.

Examples 1–4 of Table I represent pioneering and exploratory experiments. Experimental techniques were later refined and the data so accumulated are presented in Tables IIA, IIB, and III following.

In Tables I, IIA, IIB and IIC the reactor used was a vertical 48″ titanium tube having an internal diameter of 0.88″. The air, xylene, and water were preheated and then fed at the top of the reactor. The ultimate yield (presented in these tabulations) is defined as 100 times the ratio of conversions to in-line products to total conversion. The in-line products are terephthalic acid and the intermediate oxidation products in the path of formation. In the case of Example 2, the total conversion was so low that ultimate yield has little meaning. The calculated conversions are based on 100% recovery of organic materials assuming losses in handling samples to have occurred entirely in the organic liquid. This appeared to be the most reasonable basis for calculating realistic and consistent conversions.

Table I

| Example | 1 | 2 | 3 | 4 |
|---|---|---|---|---|
| Catalyst | | | | |
| Active Metal | Ru | Pd | Ru | Pd | Same
| Metal Level (1%) | 0.5 | 0.2 | 0.5 | 0.5 | as Table I—Continued

| Example | 1 | 2 | 3 | | 4 |
|---|---|---|---|---|---|
| Support | Carbon | Carbon | Carbon | $\alpha$-$Al_2O_3$ | 3 |
| Catalyst Charge (gms) | 95 | 200 | 108 | 119 | |
| Reaction conditions | | | | | |
| Temperature (°C.) | 252 | 251 | 257 | | 254 |
| Pressure (psig) | 900 | 900 | 1000 | | 1000 |
| p-Xylene Feed (Ml/Hr) | 40 | 44 | 22 | | 65 |
| Water Feed (Ml/Hr) | 800 | 804* | 550* | | 860* |
| Air (Ml/Sec-STP) | 21 | 21 | 22 | | 22 |
| Conversion (as mol % of Xylene Charge) | | | | | |
| P-Tolualdehyde | 0.1 | — | 0.1 | | 0.3 |
| P-Toluic Acid & 4CBA | 5.6 | 0.1 | 2.6 | | 1.4 |
| Terephthalic Acid | 6.5 | 3.0 | 15.4 | | 7.8 |
| CO and $CO_2$ | 4.7 | 3.9 | 4.0 | | 2.1 |

*water contained 0.05 wt. % $H_3PO_4$

Examples 5–20 show that the best yields are obtained in a reaction temperature range of about 200°C. to 250°C. and the effectiveness of ruthenium on carbon, as a catalyst and substrate, is demonstrated through these examples.

A typical preparation of the activated carbon catalyst used in tables IIA, IIB and IIC is as follows:

One hundred seventy-five grams of 10–20 mesh activated carbon was impregnated with a solution of 9.29 g. of ruthenium chloride (38.64% $RuCl_3$) in 60 ml. of concentrated hydrochloric acid. The catalyst was allowed to air dry overnight at about 32°C. in the hood. The catalyst was sealed in a vessel vented with a 1/16 inch hole in the top. The vessel was placed in a muffle furnace and heated slowly to 480°C. and maintained at that temperature for 3 hours. The container was removed and cooled to room temperature under nitrogen.

It will be noted in tables IIA, IIB and IIC the examples of reactions were conducted within given temperature ranges, e.g. IIA examples were 200°C and slightly above; IIB 225°C and slightly above; IIC 240°C–268°C. As the temperatures are increased, there is more conversion to $CO_2$ which reduces ultimate yield. It may be desirable to conduct the reactions at lower temperatures and recycle for increased ultimate yield of terephthalic acid.

TABLE IIA

Experimental Data on Ruthenium Catalyzed Oxidations

| Example | 5 | 6 | 7 | 8 | 9 | 10 |
|---|---|---|---|---|---|---|
| Catalyst | | | | | | |
| Wt.%-Metal | 1% Ru. | 1% Ru. | 1% Ru. | 1% Ru. | 1% Ru. | 1% Ru. |
| Support | Carbon | Carbon | Carbon | Carbon | Carbon | Carbon |
| Charged (gms.) | 22.0 | 44.5 | 78.3 | 140.9 | 140.9 | 91.2 |
| Density (gms/ml.) | 0.575 | 0.575 | 0.575 | 0.559 | 0.559 | 0.575 |
| Conditions | | | | | | |
| Temperature (°C.) | 200 | 200 | 204 | 205 | 201 | 206 |
| Pressure (PSIG) | 900 | 900 | 900 | 900 | 900 | 900 |
| Duration (hours) | 1.00 | 1.00 | 1.00 | 1.00 | 1.50 | 1.00 |
| Feed (gms.) | | | | | | |
| Water | 928 | 925 | 946 | 933 | 1065 | 931 |
| Oxygen (as air) | 23.4 | 23.4 | 23.4 | 23.4 | 25.1 | 11.7 |
| p-Xylene | 47.1 | 44.5 | 45.6 | 39.5 | 29.7 | 41.5 |
| Products (gms.) | | | | | | |
| Water layer | 924.9 | 920.1 | 943.1 | 931.8 | 1058.1 | 919.7 |
| Oil layer | 36.0 | 37.4 | 32.3 | 25.0 | 12.8 | 24.8 |
| Dry solids | 1.18 | 2.22 | 5.94 | 10.00 | 9.71 | 9.08 |
| Gas Analysis | | | | | | |
| Vol. % $CO_2$ | 1.17 | 1.54 | 3.66 | 5.20 | 5.25 | 5.44 |
| Solids Analysis (Wt.%) | | | | | | |
| Terephthalic acid | 5.2 | 7.1 | 11.6 | 42.1 | 44.7 | 8.4 |
| p-Toluic acid | 94.8 | 92.9 | 88.4 | 57.9 | 55.3 | 91.6 |
| Oil Analysis (Wt.%) | | | | | | |
| Benzene | 0.0001 | 0.0001 | 0.0001 | 0.0014 | 0.0017 | 0.0002 |
| Toluene | 0.036 | 0.043 | 0.050 | 0.037 | 0.038 | 0.055 |
| p-Tolualdehyde | 0.99 | 1.29 | 2.04 | 1.23 | 1.14 | 1.93 |
| Conversions (% of Xylene to:) | | | | | | |
| Terephthalic acid | 0.08 | 0.23 | 0.97 | 6.81 | 9.34 | 1.17 |
| p-Toluic acid | 1.85 | 3.61 | 8.98 | 11.43 | 14.10 | 15.63 |
| p-Tolualdehyde | 0.85 | 1.08 | 1.56 | 0.83 | 0.69 | 1.37 |
| Benzene | 0.0001 | 0.0001 | 0.0001 | 0.0014 | 0.0016 | 0.0002 |
| Toluene | 0.040 | 0.047 | 0.050 | 0.032 | 0.030 | 0.051 |
| Carbon dioxide | 1.13 | 1.57 | 3.58 | 5.73 | 8.29 | 2.78 |
| Total Conversion | 3.96 | 6.54 | 15.13 | 24.84 | 32.45 | 21.01 |
| Ultimate Yield (%) | 70.4 | 75.3 | 76.0 | 76.8 | 74.4 | 86.5 |

TABLE IIB

Experimental Data on Ruthenium Catalyzed Oxidations

| Example | 11* | 12 | 13 | 14 |
|---|---|---|---|---|
| Catalyst | | | | |
| Wt.%-Metal | None | 1% Ru. | 1% Ru. | 1% Ru. |
| Support | Ceramic Chips | Carbon | Carbon | Carbon |
| Charged (gms.) | — | 44.5 | 78.3 | 140.9 |
| Density (gms/ml.) | — | 0.575 | 0.575 | 0.559 |
| Conditions | | | | |
| Temperature (°C.) | 226 | 225 | 225 | 225 |
| Pressure (PSIG) | 900 | 900 | 900 | 900 |
| Duration (hours) | 1.00 | 1.00 | 1.00 | 1.25 |
| Feed (gms) | | | | |
| Water | 950 | 933 | 941 | 880 |
| Oxygen (as air) | 23.4 | 23.4 | 23.4 | 29.2 |
| p-Xylene | 41.0 | 46.7 | 43.9 | 51.8 |
| Products (gms.) | | | | |
| Water layer | 945.4 | 931.3 | 941.6 | 872.1 |
| Oil layer | 34.7 | 35.1 | 25.8 | 24.8 |
| Dry solids | 0.44 | 5.42 | 8.77 | 19.09 |
| Gas Analysis | | | | |
| Vol. % $CO_2$ | 0.14 | 3.64 | 6.24 | 11.5 |
| Solids Analysis (Wt.%) | | | | |
| Terephthalic acid | 45.6 | 15.2 | 17.9 | 50.4 |
| p-Toluic acid | 54.4 | 84.8 | 82.1 | 49.6 |
| Oil Analysis (Wt.%) | | | | |
| Benzene | 0.0001 | 0.0001 | 0.0001 | 0.0002 |
| Toluene | 0.022 | 0.052 | 0.083 | 0.061 |
| p-Tolualdehyde | 0.61 | 1.65 | 1.94 | 0.88 |
| Conversions: (% of Xylene to:) | | | | |
| Terephthalic acid | 0.31 | 1.13 | 2.29 | 11.87 |
| p-Toluic acid | 0.46 | 7.67 | 12.79 | 14.25 |
| p-Tolualdehyde | 0.53 | 1.28 | 1.36 | 0.485 |
| Benzene | 0.0001 | 0.0001 | 0.0001 | 0.0002 |
| Toluene | 0.025 | 0.053 | 0.075 | 0.044 |
| Carbon dioxide | 0.15 | 3.48 | 6.22 | 11.55 |
| Total Conversion | 1.48 | 13.62 | 22.73 | 38.20 |
| Ultimate Yield (%) | 87.8 | 74.1 | 72.3 | 69.7 |

*(Control wherein no catalyst was used. The very low yield of product and by-products makes the ultimate yield have very little meaning.

TABLE IIC

Experimental Data on Ruthenium Catalyzed Oxidations

| Example | 15 | 16 | 17 | 18 | 19 | 20 |
|---|---|---|---|---|---|---|
| Catalyst | | | | | | |
| Wt.%-Metal | 1% Ru. | 1% Ru. | .7% Ru. | 1% Ru. | 1% Ru. | .5% Ru. |
| Support | Carbon | Carbon | $\alpha$-$Al_2O_3$ | Carbon | Carbon | $\alpha$-$Al_2O_3$ |
| Charged (gms) | 140.9 | 166.4 | 240.1 | 206.3 | 206.3 | 147.0 |
| Density (gms/ml.) | 0.559 | 0.560 | 0.686 | 0.585 | 0.585 | 0.685 |
| Conditions | | | | | | |
| Temperature (°C.) | 240 | 254 | 258 | 264 | 268 | 227 |
| Pressure (PSIG) | 900 | 900 | 900 | 900 | 900 | 900 |
| Duration (hours) | 1.75 | 1.50 | 1.50 | 1.50 | 1.50 | 1.50 |
| Feed (gms.) | | | | | | |
| Water | 898 | 775 | 767 | 775 | 772 | 1399 |
| Oxygen (as air) | 41.0 | 35.1 | 32.1 | 32.1 | 32.1 | 35.1 |
| p-Xylene | 69.3 | 58.6 | 60.8 | 48.0 | 52.4 | 51.4 |
| Products (gms.) | | | | | | |
| Water layer | 896.9 | 772.2 | 766.8 | 766.9 | 767.2 | 1399.5 |
| Oil layer | 29.6 | 23.5 | 35.8 | 22.1 | 21.8 | 34.8 |
| Dry solids | 23.42 | 19.72 | 8.21 | 15.97 | 16.43 | 2.30 |
| Gas Analysis | | | | | | |
| Vol.% $CO_2$ | 12.1 | 13.1 | 6.05 | 11.8 | 12.8 | 1.95 |
| Solids Analysis (Wt.%) | | | | | | |
| Terephthalic acid | 59.9 | 100.00 | 96.5 | 96.2 | 96.0 | 21.5 |
| p-Toluic acid | 40.1 | 0.0 | 3.5 | 3.8 | 4.0 | 78.5 |
| Oil Analysis (Wt.%) | | | | | | |
| Benzene | 0.000 | 0.008 | 0.08 | 0.001 | 0.001 | 0.000 |
| Toluene | 0.08 | 0.08 | 0.46 | 0.16 | 0.26 | 0.025 |
| p-Tolualdehyde | 0.45 | 0.17 | 0.26 | 0.26 | 0.20 | 0.74 |
| Conversions: (% of Xylene to:) | | | | | | |
| Terephthalic acid | 12.94 | 21.50 | 8.33 | 20.45 | 19.24 | 0.62 |
| p-Toluic acid | 10.57 | 0.00 | 0.37 | 0.99 | 0.98 | 2.74 |
| p-Tolualdehyde | 0.25 | 0.10 | 0.20 | 0.15 | 0.12 | 0.62 |
| Benzene | 0.000 | 0.007 | 0.09 | 0.001 | 0.0009 | 0.000 |
| Toluene | 0.059 | 0.060 | 0.45 | 0.12 | 0.20 | 0.027 |
| Carbon Dioxide | 12.81 | 13.86 | 5.92 | 14.12 | 13.95 | 2.59 |
| Total Conversion | 36.63 | 35.53 | 15.36 | 35.82 | 34.48 | 6.59 |
| Ultimate Yield (%) | 64.9 | 60.8 | 57.9 | 60.3 | 59.0 | 60.2 |

The data set forth in Table III below demonstrates the use of palladium and silver catalyzed oxidations.

Table III

| Example | 21 | 22 | 23 | 24 | 25 | 26 |
|---|---|---|---|---|---|---|
| Catalyst | | | | | | |
| Wt. %-Metal | 1% Pd. | 1% Pd. | 1% Pd. | 1% Pd. | .5% Ag. | .5% Ag. |
| Support | Carbon | Carbon | Carbon | Carbon | Carbon | Carbon |
| Charged (gms.) | 134.5 | 134.5 | 134.5 | 134.5 | 175.2 | 208.9 |
| Density (gms./ml.) | 0.510 | 0.510 | 0.510 | 0.510 | 0.498 | 0.592 |
| Conditions | | | | | | |
| Temperature (°C.) | 246 | 254 | 263 | 253 | 200 | 226 |
| Pressure (PSIG) | 900 | 900 | 900 | 900 | 900 | 900 |
| Duration (hours) | 1.50 | 1.50 | 1.50 | 1.50 | 1.00 | 1.00 |
| Feed (gms.) | | | | | | |

Table III—Continued

| Example | 21 | 22 | 23 | 24 | 25 | 26 |
|---|---|---|---|---|---|---|
| Water | 768 | 766 | 771 | 773 | 934 | 932 |
| Oxygen (as air) | 32.1 | 32.1 | 32.1 | 35.1 | 23.4 | 11.7 |
| p-Xylene | 62.3 | 66.9 | 61.5 | 116.6 | 40.3 | 41.2 |
| Products (gms.) | | | | | | |
| Water layer | 777.9 | 765.8 | 682.7 | 773.1 | 947.4 | 932.7 |
| Oil layer | 37.5 | 52.6 | 46.1 | 95.7 | 17.0 | 17.6 |
| Dry Solids | 4.39 | 5.33 | 3.80 | 5.41 | 4.72 | 5.24 |
| Gas Analysis | | | | | | |
| Vol.%CO$_2$ | 10.5 | 11.7 | 12.5 | 10.4 | 5.09 | 7.84 |
| Solids Analysis (Wt.%) | | | | | | |
| Terephthalic acid | 69.3 | 65.2 | 77.9 | 92.4 | 44.2 | 44.1 |
| p-Toluic acid | 30.7 | 34.8 | 22.1 | 7.6 | 55.8 | 55.9 |
| Oil Analysis | | | | | | |
| Benzene | 0.02 | 0.04 | 0.05 | 0.008 | 0.000 | 0.0002 |
| Toluene | 0.30 | 0.20 | 0.20 | 0.14 | 0.059 | 0.049 |
| p-Tolualdehyde | 1.40 | 1.20 | 1.00 | 0.90 | 4.35 | 2.71 |
| Conversions (% of Xylene to:) | | | | | | |
| Terephthalic acid | 3.12 | 3.32 | 3.08 | 2.74 | 3.31 | 3.58 |
| p-Toluic acid | 1.69 | 2.16 | 1.06 | 0.28 | 5.10 | 5.54 |
| p-Tolualdehyde | 1.05 | 0.89 | 0.74 | 0.73 | 3.23 | 2.08 |
| Benzene | 0.023 | 0.046 | 0.057 | 0.010 | 0.00 | 0.002 |
| Toluene | 0.29 | 0.194 | 0.193 | 0.147 | 0.059 | 0.049 |
| Carbon dioxide | 10.13 | 10.45 | 12.18 | 5.84 | 5.60 | 4.07 |
| Total Conversion | 16.31 | 17.07 | 17.31 | 9.74 | 17.38 | 15.34 |
| Ultimate Yield (%) | 35.9 | 37.4 | 28.2 | 38.4 | 67.5 | 73.1 |

In the above examples, the product was prepared using a fixed bed catalyst system. Preparation of the carboxylic acids has also been found possible using a fluid bed catalyst system.

Two experiments were conducted which established that aqueous phase oxidation of p-xylene functioned in a fluid bed catalyst system. The apparatus used was essentially the same as that referred to above prior to the tables, except that reactants and water were introduced at the bottom of the reactor column and product was taken off at the top.

The preferrred system will be dictated by the size of the reactor, the techniques generally utilized by the engineers, etc., and no preference is meant by the examples set forth hereinabove. The examples are meant to illustrate the reaction rather than in any way limit the technique.

The tables and the examples have set forth illustrative conditions and illustrative yields of carboxylic acids, i.e, terephthalic acid/p-toluic acid, however, other methylated benzenes may be oxidized to provide other carboxylic acids. For example, it has been found that pseudocumene may be oxidized to form trimellitic acid and durene may be oxidized to form pyromellitic acid.

The oxidation of a great variety of other methylated benzenes will be obvious to those skilled in the art. The scope of the invention is limited only by the claims which are set forth hereafter.

We claim:

1. A method for the preparation of aryl carboxylic acids by the catalytic oxidation of methylated benzenes comprising contacting a mixture of water and a methylated benzene in a weight ratio of from 3:1 to 30:1 respectively, and an oxygen-containing gas with a noble metal catalyst selected from the group silver, palladium, ruthenium, platinum, rhodium, iridium, and osmium, at an elevated temperature under a pressure sufficient to maintain said mixture in the liquid phase.

2. The method of claim 1 wherein the temperature is maintained within a range of from about 170°C. to about 300°C. and the pressure of the system is maintained in a range of from about 300 psig to about 1200 psig.

3. The method of claim 1 wherein the noble metal catalyst is on a catalyst-supporting substrate, said noble metal catalyst selected from the group consisting of silver, palladium, ruthenium, platinum, rhodium, iridium and osmium and said substrate selected from the group consisting of water-insoluble forms of alumina, silica, titania, zirconia, silicon carbide and carbon.

4. The method of claim 1 wherein the methylated benzene is of the formula

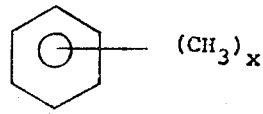

wherein X is an integer having a value of from 2 to 6.

5. The method of claim 1 wherein the methylated benzene is selected from the group consisting of p-xylene, pseudocumene and durene and the carboxylic acid formed from the methylated benzenes is selected respectively from the group terephthalic acid, trimellitic acid and pyromellitic acid.

6. A method for the preparation of aryl carboxylic acids by catalytically oxidizing methylated benzenes comprising contacting a mixture of an oxygen-containing gas, water and a methylated benzene selected from the group consisting of p-xylene, pseudocumene and durene with a noble metal catalyst on a catalyst support, said noble metal catalyst selected from the group of silver, platinum, palladium, ruthenium, rhodium, iridium and osmium, and said catalyst support selected from the group consisting of water-insoluble forms of alumina, silica, titania, zirconia, silicon carbide and carbon, at a temperature in the range from about 170°C. to about 300°C. and a pressure in the range from about 300 psig to about 1200 psig and wherein the water and methylated benzene are in the weight ratio from 3:1 to 30:1 respectively.

* * * * *